A. & W. GILLIES.
PROCESS FOR THE MANUFACTURE OF ARTIFICIAL STONE.
APPLICATION FILED MAR. 18, 1911.

1,038,115.   Patented Sept. 10, 1912.

UNITED STATES PATENT OFFICE.

ALFRED GILLIES AND WILLIAM GILLIES, OF WESTON, ONTARIO, CANADA.

PROCESS FOR THE MANUFACTURE OF ARTIFICIAL STONE.

1,038,115.  Specification of Letters Patent.  Patented Sept. 10, 1912.

Application filed March 18, 1911. Serial No. 615,413.

*To all whom it may concern:*

Be it known that we, ALFRED GILLIES and WILLIAM GILLIES, subjects of the King of Great Britain, and residents of the village of Weston, county of York, Province of Ontario, Dominion of Canada, have invented certain new and useful Improvements in Processes for the Manufacture of Artificial Stone; and we do hereby declare that the following is a full, clear, and exact description of the same.

The invention relates to an improved process for the manufacture of artificial stone, as described in the following specification and illustrated in the accompanying drawings that form part of the same.

The objects of the invention are, to produce a superior quality of artificial stone having a polishing surface, to obviate seam marks and other undesirable irregularities of surface, and to materially reduce the cost of production of artificial stones with polishing surfaces.

The invention consists essentially in the novel steps in the process as hereinafter set forth and particularly referred to in the claims.

Figure 1:
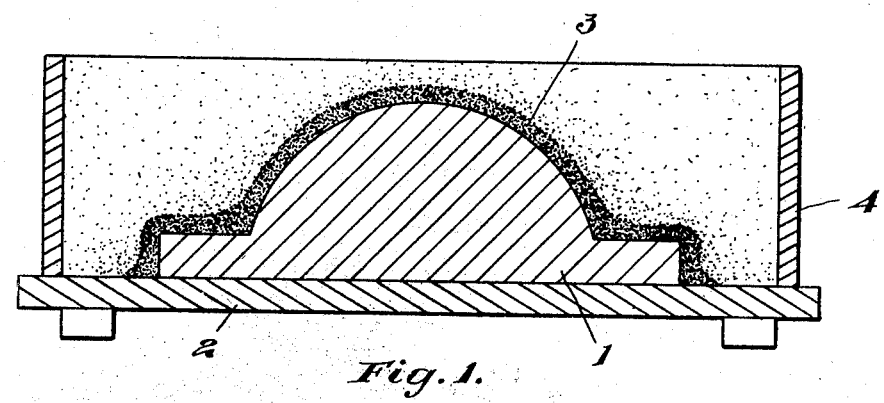
Figure 2:
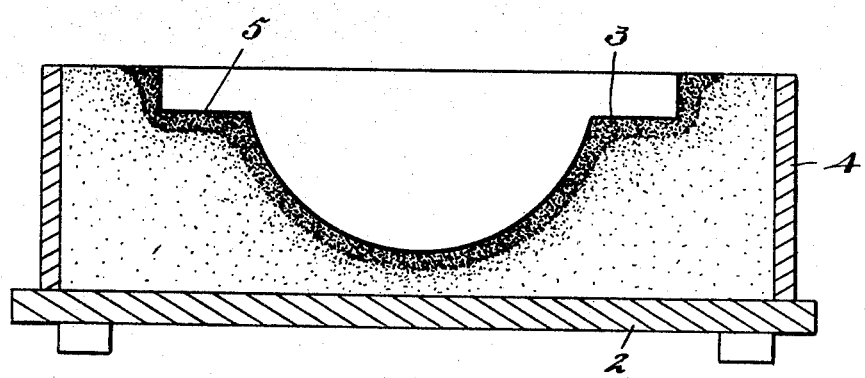
Figure 3:
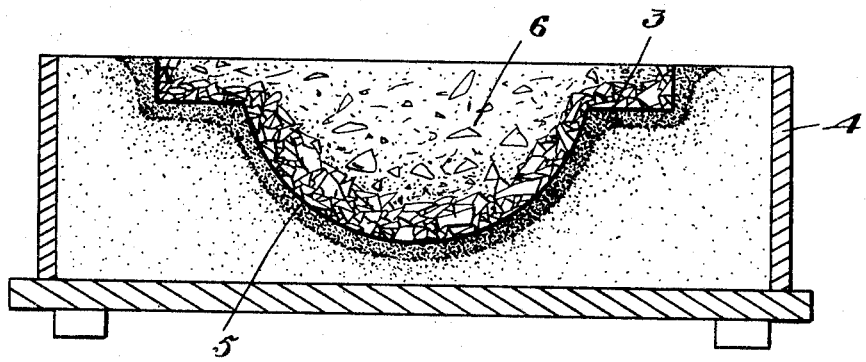

In the drawings, Figure 1 is a vertical sectional view of a mold showing the pattern in place and the arrangement of the mold materials. Fig. 2 is a vertical sectional view of the mold inverted and the pattern removed. Fig. 3 is a vertical sectional view of the mold showing the material forming the artificial stone, molded therein.

Like numerals of reference indicate corresponding parts in each figure.

Processes for manufacturing artificial stone having a surface which may be polished are at present known but they are all very expensive to operate, the molds being either made of plaster of Paris or of wood and in these processes it has been necessary to leave the stone material being molded, in the molds for a period sufficient to allow the said material to set. Expensive molds are thus inactive for a considerable period and if a large quantity of the stones are required they cannot be made in a short period unless a number of molds are made and this adds considerably to the cost. Plaster of Paris molds are not very successful as the material is softened by the moisture and the necessary tamping of the stone material forces the sharp particles of marble or granite into the surface of the mold thus producing the very rough surface which requires an excessive amount of grinding to reduce the surface to a smooth polished surface. Wood molds, besides being expensive are liable to have joints or cracks and knot holes which may be more or less open and the soft cement material of the stone mixture flows into the fissures forming seams or inequalities which are very undesirable.

In the present process, the pattern 1, made to the shape of the stone which it is desired to mold, is placed on the mold board 2. A mixture of dry Portland cement and slightly dampened sand 3 is placed over the surface of the pattern and packed closely thereon. The flask or mold box 4 is then filled with damp sand and tamped down solidly. The flask is then inverted and the pattern 1 withdrawn, the mixture 2 being sufficiently damp to cohere so that a perfect mold will be left. The mold is then set aside and left for a day or two. The moisture in the sand of the mold acts upon the Portland cement and hardens the sand and cement mixture thereby forming a hard shell on the face of the mold. When the mold thus formed is thoroughly set the face is covered with a thin coating 5 of shellac, or the like. After the shellac is set the stone mixture 6, formed of a mixture of crushed marble or granite and Portland cement and sand if desired, is poured into the mold. The mixture is then tamped thoroughly, care being taken to force the particles of marble or granite into contact with the surface of the mold.

In order to accomplish the desired result the mixture is subjected to a considerable amount of pounding so that the marble or granite particles will be brought into contact with the mold surface to the exclusion of the cement or sand, that is to say, the said particles will form a solid mass against the mold face.

The cement shell of the mold is hard and effectually resists the pounding process consequently a smooth and uniform surface to the artificial stone is produced. The shellac coating prevents the cement of the stone mixture from adhering to the mold and when the mixture has set thoroughly the stone may be removed and the mold used again if desired.

With a process such as described, any desired number of molds may be made from one pattern at very slight cost and the quantity of artificial stones which may be turned out is limited only by the available space for the accommodation of the molds.

It will be readily understood that not only is there a very great saving in expense but great economy of time is effected and a much superior article is produced.

What we claim as our invention is:—

1. A process for the manufacture of artificial stone, consisting in first forming a mold with a cement surface, then filling the pores of the face of the mold and covering the surface thereof with a substance in liquid form which when dry presents a hard surface non-adhesive to cement, then placing a mixture of cement and particles of stone in the mold, and finally forcing the stone particles of said mixture into contact with the non-adhesive surface of the mold to the practical exclusion of the cement.

2. A process for the manufacture of artificial stone, consisting, in first covering a pattern with a layer of a mixture of damp sand and dry cement tamping down hard, then completing the mold with a backing of damp sand packing hard, then removing the pattern and allowing the cement layer to set hard, then filling the pores of the mold with a hard-drying substance rendering the mold surface non-adhesive, then placing a mixture of cement and stone particles in the mold, and finally forcing the stone particles of said mixture into contact with the mold surface to the practical exclusion of the cement to form a stone faced molded block.

Signed at the city of Toronto, county of York, Ontario, Canada, this 10th day of March 1911.

ALFRED GILLIES.
WILLIAM GILLIES.

Witnesses:
H. DENNISON,
E. HERON.